United States Patent
Matsuki et al.

(10) Patent No.: US 6,657,833 B2
(45) Date of Patent: Dec. 2, 2003

(54) RELAY WELDING DETECTOR AND DETECTING METHOD

(75) Inventors: Tsutomu Matsuki, Nishikamo-gun (JP); Toshihiro Katsuda, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 133 days.

(21) Appl. No.: 09/987,053

(22) Filed: Nov. 13, 2001

(65) Prior Publication Data

US 2002/0070608 A1 Jun. 13, 2002

(30) Foreign Application Priority Data

Dec. 8, 2000 (JP) ........................................ 2000-374759

(51) Int. Cl.$^7$ ................................................ H02H 5/04
(52) U.S. Cl. .......................................... 361/23; 361/23
(58) Field of Search ................................ 361/155, 156, 361/23, 2; 307/63, 64, 65, 66, 10.1, 10.7, 9.1

(56) References Cited

U.S. PATENT DOCUMENTS

| | | | | |
|---|---|---|---|---|
| 4,713,716 A | * | 12/1987 | Takemura et al. | ........... 318/299 |
| 5,631,769 A | * | 5/1997 | Wheatley | ................ 359/337 |
| 5,965,991 A | * | 10/1999 | Koike et al. | ................. 318/139 |
| 5,994,789 A | * | 11/1999 | Ochiai | ........................ 307/10.1 |
| 6,137,193 A | * | 10/2000 | Kikuoka et al. | ............. 307/137 |
| 6,220,380 B1 | * | 4/2001 | Mita et al. | ................... 180/65.1 |
| 6,459,167 B1 | * | 10/2002 | Yamanashi | ................... 307/9.1 |
| 6,488,107 B1 | * | 12/2002 | Ochiai et al. | .............. 180/65.2 |

FOREIGN PATENT DOCUMENTS

| | | |
|---|---|---|
| JP | A 6-233401 | 8/1994 |
| JP | A 7-274302 | 10/1995 |
| JP | A 10-144194 | 5/1998 |

* cited by examiner

*Primary Examiner*—Gregory J. Toatley, Jr.
*Assistant Examiner*—Danny Nguyen
(74) *Attorney, Agent, or Firm*—Oliff & Berridge, PLC

(57) ABSTRACT

Frequency of judgment of welding of relays is increased to increase likelihood of early detection of welding. It is determined that a battery 22 is not being recharged or discharged when a vehicle speed V of an electric vehicle is approximately 0 and a brake pedal 54 is pressed, and a switching element of an inverter 24 is controlled to be switched to discharge electric charges which are stored in a capacitor 44. After discharging, relays 30, 32 are turned off, and voltages RV1, RV2 between the terminals of the relays 30, 32 are detected by voltmeters 40, 42 to judge whether either of the voltages RV1, RV2 has a threshold value RVref (approximate value 0) or less. When it is so determined, it is judged that the relays 30, 32 are welded, and an LED 70 is illuminated.

11 Claims, 2 Drawing Sheets

RELAY WELDING DETECTOR AND DETECTING METHOD

BACKGROUND OF THE INVENTION

1. Field of the Invention

The present invention relates to a relay welding detector, and more particularly to a relay welding detector for detecting welding of a relay which is disposed between a switching element and a secondary battery in a system for supplying power from the secondary battery to a load through the switching element and which connects or disconnects a power line running from the secondary battery to the load.

2. Description of the Related Art

There has been proposed a relay welding detector and detecting method which detects welding of a relay when operation of an electric motor is started or stopped by operation of a key switch (e.g., Japanese Patent Laid-Open Publication No. Hei 10-144194). In that detector, a terminal voltage of the electric motor is detected in a relay off state immediately before the operation of the electric motor is started by an operator who turns on the key switch, or a state that the operation of the electric motor is stopped and the relay is turned off as the key switch is turned off. It is judged that the relay is welded when the detected terminal voltage exceeds a predetermined value.

However, such welding detectors detect welding only when the electric motor is started or stopped its operation, so that it may need a long time to detect welding after the relay is actually welded. The relay is welded when an unexpected large current flows to the electric motor because of a failure in the system, but if the large current is produced when the electric motor is operating, the operation is continued with the relay in the welded state, and the safety of the system may be adversely affected.

SUMMARY OF THE INVENTION

It is an object of the present invention to provide relay welding detector and detecting method which can detect welding of the relay at an earlier stage by increasing a frequency of judgment of the welding of the relay.

In order to achieve the aforesaid object of the present invention, the relay welding detector of the invention is provided with the following manners.

A first relay welding detector according to the present invention may be configured as a relay welding detector for detecting welding of a relay which is disposed between a switching element and a secondary battery in a system for supplying power from the secondary battery to a load through the switching element and which connects or disconnects a power line running from the secondary battery to the load, comprising a recharging and discharging state detector which detects recharging and discharging states of the secondary battery; an interruption instructing device which instructs an interruption of the power line by the relay when it is determined by the recharging and discharging state detector that the secondary battery is not being recharged or discharged when the power line is connected by the relay; and a welding judging device which judges welding of the relay when the interruption is instructed.

In this first relay welding detector of the present invention, when it is determined that the secondary battery is not being recharged or discharged while the power line is connected by the relay, the interruption instructing device instructs interruption of the power line by the relay, and when the interruption is instructed, the welding judging device judges welding of the relay. According to the first relay welding detector of the present invention, when it is determined that the secondary battery is not being recharged or discharged, the relay is interrupted and its welding is judged, even if the power line is connected by the relay, such that welding judgement can be performed more frequently. As a result, welding of the relay can be detected earlier.

In the first relay welding detector of the present invention, the recharging and discharging state detector may be a sensor for detecting an electric current flowing to the secondary battery, and the interruption instructing device is a device for instructing to interrupt the power line by the relay when the detected current has an approximate value 0.

The first relay welding detector of the present invention may comprise a capacitor disposed between the relay and the switching element and a voltage lowering device which lowers the voltage of the capacitor when the interruption instructing device instructs to interrupt the power line by the relay, wherein the welding judging device is a device for judging welding of the relay when the voltage of the capacitor is lowered by the voltage lowering device. Thus, the electric charge stored in the capacitor can be discharged faster, and welding of the relay can be judged more accurately.

In the first relay welding detector of the present invention, the load may be an electric motor which is driven with a three-phase alternating current, the switching element may be an inverter, and the power line may be a line connected to each phase wound around the electric motor.

A second relay welding detector according to the present invention may be configured as a relay welding detector for detecting welding of a relay which is disposed between a secondary battery and an inverter in a vehicle having a drive system for supplying power from the secondary battery to an electric motor through the inverter and which connects or disconnects a power line running from the secondary battery to the electric motor, comprising a running speed detector which detects a running speed of the vehicle; a braking operation detector which detects operation of brakes of the vehicle; an interruption instructing device which instructs interruption of the relay when a running speed detected by the running speed detector is approximately 0 with the power line connected by the relay and operation of brakes is detected by the braking operation detector; and a welding judging device which judges welding of the relay when the interruption is instructed.

In the second relay welding detector of the present invention, when the running speed of the vehicle detected by the running speed detector is approximately 0 with the power line connected by the relay and the operation of brakes is detected by the braking operation detector, the interruption instructing device instructs interruption of the relay, and, when the interruption is instructed, the welding judging device judges the welding of the relay. According to the second relay welding detector of the present invention, when the vehicle has substantially stopped and the brakes are applied, welding of the relay can be judged by instructing disconnection of the power line by the relay even if the power line is connected by the relay. As a result, a frequency of judging the welding of the relay can be increased, and the welding of the relay can be detected earlier.

In the first or second relay welding detector of the present invention, the welding judging device can be a device which is provided with a voltage detector for detecting a voltage between terminals of the relay and judges that the relay is welded when the detected voltage is below a predetermined value. Thus, welding of the relay can be easily detected.

The method for detecting welding of a relay according to the present invention may be configured as a method for detecting welding of a relay which is disposed between a switching element and a secondary battery in a system for supplying power from the secondary battery to a load through the switching element and which connects or disconnects a power line running from the secondary battery to the load, comprising the steps of (a) detecting recharging and discharging states of the secondary battery; (b) instructing an interruption of the power line by the relay when the power line is connected by the relay and it is determined from the detected recharging and discharging states that the recharging and discharging are not being performed; and (c) judging welding of the relay when the interruption is instructed.

In the method for detecting welding of a relay of the present invention, when it is determined that the secondary battery is not being recharged or discharged while the power line is connected by the relay, the interruption of the power line by the relay is instructed, and, when the interruption is instructed, the welding of the relay is judged. According to the method for detecting welding of a relay of the present invention, when it is determined that the secondary battery is not being recharged or discharged, the relay is interrupted and its welding is judged, even if the power line is connected by the relay, such that welding judgment can be performed more frequently. As a result, welding of the relay can be detected earlier.

In the method for detecting welding of a relay of the present invention, the step (a) may be a step for detecting an electric current flowing to the secondary battery, and the step (b) may be a step for instructing interruption of the power line when the detected current value is approximately 0.

The method for detecting welding of a relay of the present invention may further comprise a step (d) for lowering the voltage of a capacitor which is disposed between the relay and the switching element when the step (b) instructs interruption of the power line by the relay, wherein the step (c) may be a step for judging welding of the relay when the voltage of the capacitor is lowered by the step (d). Thus, the electric charge stored in the capacitor can be discharged faster, and welding of the relay can be judged more accurately.

In the method for detecting welding of a relay of the present invention, the step (c) may be a step for judging that the relay is welded when the voltage between the terminals of the relay is below a predetermined value.

DESCRIPTION OF PREFERRED EMBODIMENT

Figure 1:
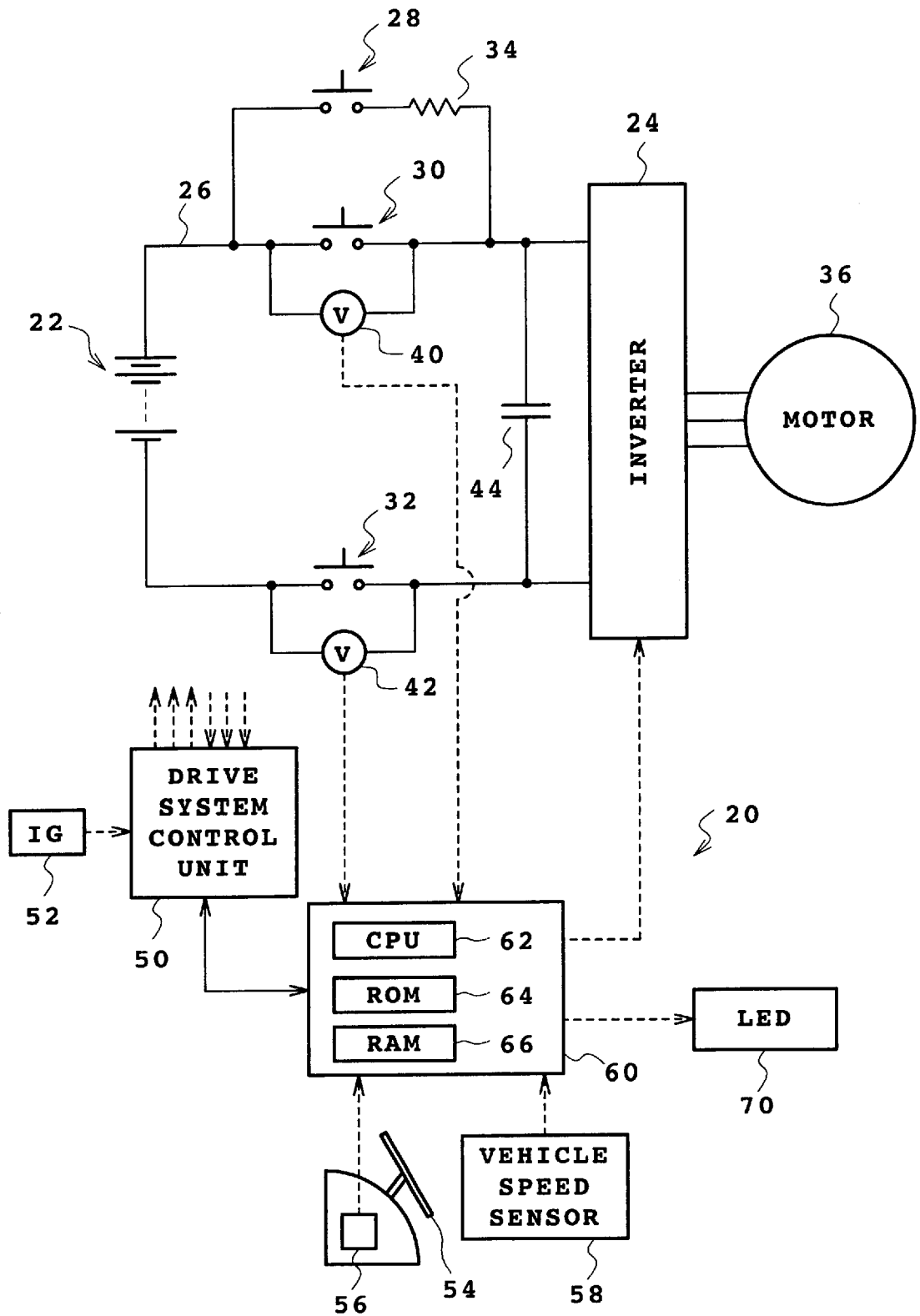
FIG. 1 is a structural diagram schematically showing a structure of a system provided with a battery and a motor which are mounted on an electric vehicle to which a relay welding detector according to one embodiment of the invention is applied.

An embodiment of the present invention will be described below. FIG. 1 is a structural diagram schematically showing a structure of a drive system provided with a battery 22 and a motor 36 which are mounted on an electric vehicle to which the relay welding detector 20 according to one embodiment of the invention is applied. The drive system mounted on the electric vehicle will first be described.

As shown in FIG. 1, this drive system is configured to supply power from the battery 22 to the motor 36 after converting it into a three-phase alternating current suitable for driving the motor 36 by an inverter 24. Relays 28, 30, 32 which connect or disconnect the electric power from the battery 22 to the motor 36 are disposed on a power line 26 which is connected to an output terminal of the battery 22. The relay welding detector 20 of the embodiment detects welding of the relays 30, 32. A capacitor 44 is connected to the power line 26 running between the relays 28, 30, 32 and the inverter 24, so that the capacitor 44 can be recharged with the electric power from the battery 22 to stably supply the electric power to the motor 36. In order to prevent the capacitor 44 from being recharged quickly when the system is started, a resistor 34 is connected in series with the relay 28 which is connected in parallel with the relay 30, and when the system is started, the relay 28 is turned on first, and the relay 30 is turned on next. Thus, the operation of the drive system is controlled by the drive system control unit 50 when an ignition switch 52 is turned on by the operator.

The relay welding detector 20 of the embodiment has the aforesaid inverter 24 which is disposed on the drive system of the electric vehicle, voltmeters 40, 42 which are disposed between terminals of the relays 30, 32, and an electronic control unit 60 which judges welding of the relays 30, 32.

The electronic control unit 60 is configured as a microprocessor having CPU 62 as the core and has ROM 64 in which a processing program is stored, RAM 66 in which data is stored temporarily, a communications port (not shown) for communications with the drive system control unit 50 which controls the drive system of the electric vehicle, and I/O ports (not shown). A brake pedal position BP from a brake pedal position sensor 56 which detects an operating state of a brake pedal 54 of the electric vehicle and a vehicle speed V from a vehicle speed sensor 58 which detects a running speed of the electric vehicle are input to the electronic control unit 60 through the input port. And, the electronic control unit 60 outputs a switch signal to the inverter 24 and a lighting signal to LED 70 which lights up when welding of the relays 30, 32 is detected through the output port.

Figure 2:
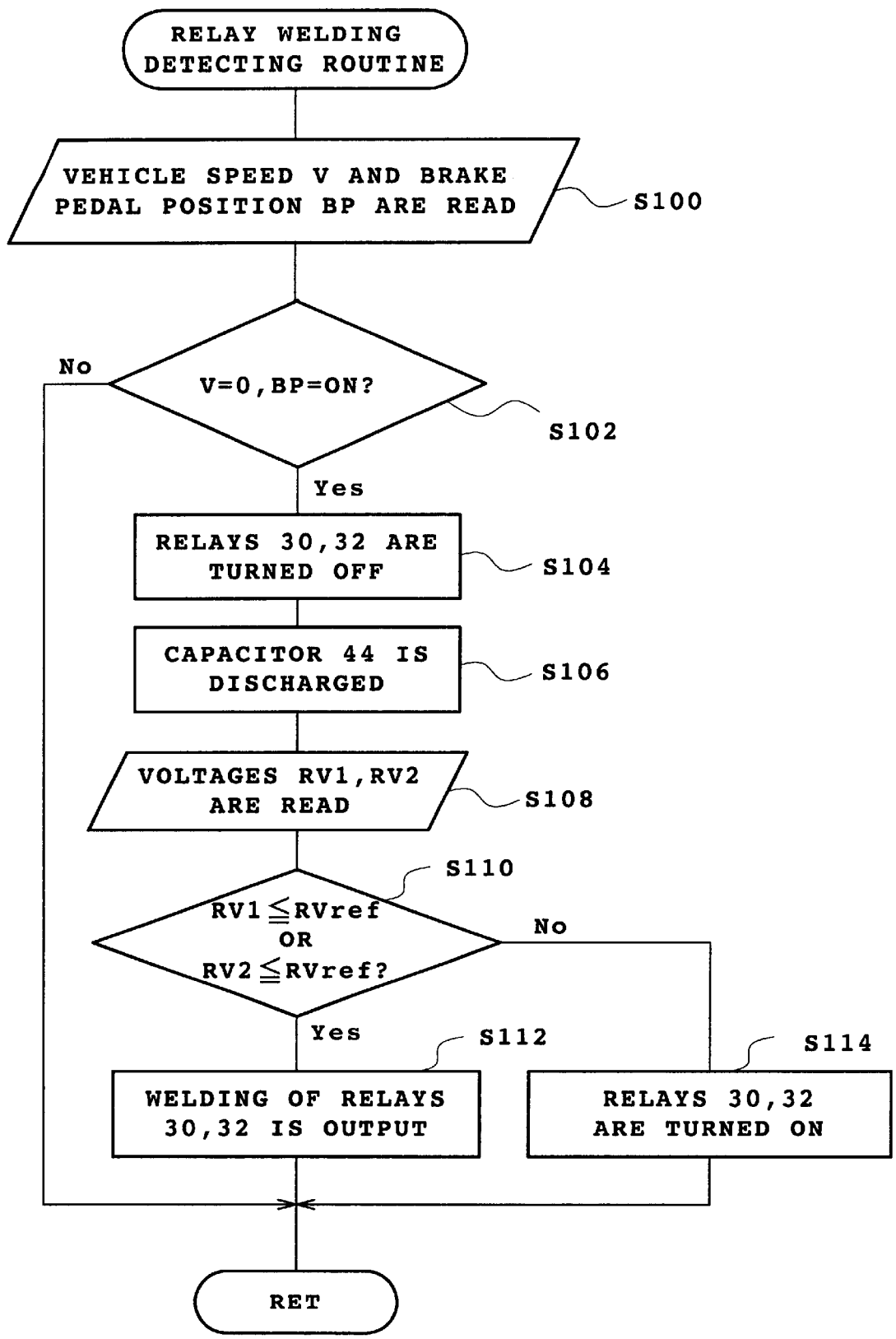
FIG. 2 is a flowchart showing an example of a welding detecting routine executed by a control unit 50 of a relay welding detector 20.

Then, an operation of the relay welding detector 20 of the embodiment configured as described above, and particularly its operation to detect the welding of the relays 30, 32, will be described. FIG. 2 is a flowchart showing an example of a welding detecting routine executed by the CPU 62 of the electronic control unit 60. This routine is repeatedly performed at predetermined time intervals when the operator of the electric vehicle turns on the ignition switch 52 to input ON signals of the relays 30, 32 from the drive system control unit 50.

When the welding detecting routine is executed, the CPU 62 of the electronic control unit 60 first reads the vehicle speed V from the vehicle speed sensor 58 and the brake pedal position BP from the brake pedal position sensor 56 (step S100), and judges from the read signals whether the value of the vehicle speed V is approximately 0 and whether the brake pedal 54 is pressed or not (step S102). In a process to judge whether the battery 22 is being recharged or discharged, and when it is not being recharged or discharged, it is judged that the relays 30, 32 can be turned off, and it is instructed to turn off the relays 30, 32 to determine whether they are welded or not. When it is determined that the vehicle speed V does not have an approximate value 0 or that the brake pedal 54 is not being pressed, it is judged that the battery 22 is being recharged or discharged and judgment of welding is inappropriate, and this routine is terminated.

Meanwhile, when it is judged that the vehicle speed V has an approximate value 0 and the brake pedal 54 is being pressed, an OFF signal is output to the drive system control unit 50 to turn off the relays 30, 32 (step S104) and a switching signal is also output to the switching element of the inverter 24 to execute the processing to discharge electric charges stored in the capacitor 44 (step S106). When the electric charges stored in the capacitor 44 are discharged, voltages RV1, RV2 are read from the voltmeters 40, 42 connected between the terminals of the relays 30, 32 (step S108) and it is judged whether either of the voltages RV1, RV2 has a predetermined threshold value RVref or less (step S110). Here, the threshold value RVref is a threshold value for judging the welding of the relays 30, 32 and set to a value slightly higher than 0 considering the resistance of a welded portion of the relays 30, 32 and measurement errors of the voltmeters 40, 42.

When it is determined that either of the voltages RV1, RV2 has a threshold value RVref or less, it is judged that the relays 30, 32 are welded, and a lighting signal is output to the LED 70 which indicates the welding of the relays 30, 32 (step S112) before ending the routine. Meanwhile, when both of the voltages RV1, RV2 exceed the threshold value RVref, it is judged that the relays 30, 32 are not welded, and a signal is output to the drive system control unit 50 to turn on the relays 30, 32 again (step S114) before the routine is terminated. Thus, it is judged that the relays 30, 32 are not abnormal, and the drive system control unit 50 controls the drive system normally.

With the relay welding detector 20 of the present embodiment, when the value of the vehicle speed V is approximately 0 and the brake pedal 54 is pressed, the relays 30, 32 are turned off if they are on and their welding is judged, so that a frequency of judging the welding can be increased. As a result, welding of the relays 30, 32 can be detected at an early stage, and the safety of the drive system of the electric vehicle can be improved.

In the above description of the present embodiment of the relay welding detector 20, it was assumed that the battery 22 was not being recharged or discharged when the vehicle speed V of the electric vehicle had the approximate value 0 and the brake pedal 54 was pressed, but any method that can detect the recharging and discharging states of the battery 22 can be employed. For example, the invention may be configured such that a current flowing to the battery 22 is detected by a current sensor, and it is judged that recharging or discharging are not being performed when the value of the detected current is approximately 0. For any system other than the drive system of the electric vehicle, as long as a relay is one used for a system which supplies the electric power from the battery to a load through a switching element, the relay welding detector 20 can be used to detect welding of the relay.

Although in the example used to illustrate the present embodiment, the relay welding detector 20 switches the switching element of the inverter 24 to discharge the electric charges stored in the capacitor 44, other configurations, such as, for example, connecting a switching element which is connected to a transformer of a DC voltage such as a DC-DC converter to the capacitor 44 and switching the switching element to forcibly lower the voltage of the capacitor 44, may be preferably employed. Here, the electric charges stored in the capacitor 44 can be discharged quickly, so that welding of the relays 30, 32 can be determined more accurately and quickly. Also, while as described above the relay welding detector 20 comprises a capacitor 44 as a device for storing an electric charge disposed between the relays 30, 32 and the inverter 24, but the capacitor may be omitted.

In addition, while in the example used to illustrate the present embodiment, the relay welding detector 20 determines the welding of the relays 30, 32 from the voltage between the terminals of the relays 30, 32, welding of the relays may be determined by any method which can judge welding of the relays. For example, welding may be determined on from an electric current supplied to the motor 36 or from the voltage between the terminals of the battery 22. Also, a voltage sensor may be disposed between the relays 30, 32 and the inverter 24 to determine welding from the voltage detected by the voltage sensor, e.g., it is judged that the relays 30, 32 are welded when the voltage does not drop within a predetermined time after they are turned off.

While the relay welding detector 20 of the embodiment is designed to determine the welding of the relays 30, 32, it may also be used to determine welding of the relay 28.

While there has been described that what is at present considered to be a preferred embodiment of the present invention, it is to be understood that various modifications may be made thereto, and it is intended that the appended claims cover all such modifications as fall within the true spirit and scope of the invention.

What is claimed is:

1. A relay welding detector for detecting welding of a relay which is disposed between a switching element and a secondary battery in a system for supplying power from the secondary battery to a load through the switching element and which connects or disconnects a DC power line running from the secondary battery to the switching element, comprising:

a recharging and discharging state detector which detects recharging and discharging states of the secondary battery;

an interruption instructing device which, when the DC power line is connected by the relay and it is determined by the recharging and discharging state detector that the secondary battery is not being recharged or discharged, instructs an interruption of the DC power line by the relay which is not being supplied with recharging or discharging power from the secondary battery; and a welding judging device which judges welding of the relay when the interruption is instructed.

2. The relay welding detector according to claim 1, wherein:

the recharging and discharging state detector is a sensor for detecting an electric current flowing to the secondary battery, and the interruption instructing device is a device for instructing interruption of the DC power line when the detected current value is approximately 0.

3. The relay welding detector according to claim 1, further comprising:

a capacitor which is disposed between the relay and the switching element; and a voltage lowering device which lowers the voltage of the capacitor when the interruption instructing device instructs interruption of the DC power line by the relay, wherein:

the welding judging device is a device for judging welding of the relay when the voltage of the capacitor is lowered by the voltage lowering device.

4. The relay welding detector according to claim 1, wherein:

the load is an electric motor which is driven with a three-phase alternating current;

the switching element is an inverter; and a line connected to each phase wound around the electric motor provides the three-phase alternating current.

5. The relay welding detector according to claim 1, wherein the welding judging device is a device which is provided with a voltage detector for detecting a voltage between terminals of the relay and judges that the relay is welded when the detected voltage is below a predetermined value.

6. A relay welding detector for detecting welding of a relay which is disposed between a secondary battery and an inverter in a vehicle having a drive system for supplying power from the secondary battery to an electric motor through the inverter and which connects or disconnects a DC power line running from the secondary battery to the inverter, comprising:

a running speed detector which detects a running speed of the vehicle;

a braking operation detector which detects the operation of brakes of the vehicle;

an interruption instructing device which instructs interruption of the relay when a running speed detected by the running speed detector is approximately 0 with the DC power line connected by the relay and an operation of brakes is detected by the braking operation detector; and a welding judging device which judges welding of the relay when the interruption is instructed.

7. The relay welding detector according to claim 6, wherein the welding judging device comprises a voltage detector for detecting a voltage between the terminals of the relay and judges that the relay is welded when the detected voltage is below a predetermined value.

8. A method for detecting welding of a relay which is disposed between a switching element and a secondary battery in a system for supplying power from the secondary battery to a load through the switching element and which connects or disconnects a DC power line running from the secondary battery to the switching element, comprising the steps of:

(a) detecting recharging and discharging states of the secondary battery;

(b) instructing, when the DC power line is connected by the relay and it is determined from the detected recharging and discharging states that recharging and discharging are not being performed, an interruption of the power line by the relay which is determined as not being supplied with recharging or discharging power of the secondary battery; and (c) judging welding of the relay when the interruption is instructed.

9. The method for detecting welding of a relay according to claim 8, wherein:

the step (a) is a step for detecting an electric current flowing to the secondary battery, and the step (b) is a step for instructing interruption of the DC power line when the detected current value is approximately 0.

10. The method for detecting welding of a relay according to claim 8, further comprising the step of:

(d) lowering the voltage of a capacitor which is disposed between the relay and the switching element when the step (b) instructs interruption of the DC power line by the relay, wherein:

the step (c) is a step for judging welding of the relay when the voltage of the capacitor is lowered by the step (d).

11. The method for detecting welding of a relay according to claim 8, wherein:

the step (c) is a step for judging that the relay is welded when the voltage between the terminals of the relay is below a predetermined value.

* * * * *